(12) United States Patent
Cheng

(10) Patent No.: US 6,637,946 B2
(45) Date of Patent: Oct. 28, 2003

(54) ADAPTER FOR AN OPTICAL FIBER PLUG

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 15 days.

(21) Appl. No.: 10/098,946

(22) Filed: Mar. 14, 2002

(65) Prior Publication Data

US 2003/0174972 A1 Sep. 18, 2003

(51) Int. Cl.[7] .................................................. G02B 6/36
(52) U.S. Cl. ........................ 385/77; 385/78; 439/638; 439/668
(58) Field of Search ................... 385/77, 78; 439/638, 439/668, 669

(56) References Cited

U.S. PATENT DOCUMENTS

| | | | | |
|---|---|---|---|---|
| 4,813,760 A | * | 3/1989 | Tanaka et al. ................. | 385/62 |
| 4,846,719 A | * | 7/1989 | Iwashita ....................... | 439/63 |
| 5,082,344 A | * | 1/1992 | Mulholland et al. .......... | 385/60 |
| 5,301,250 A | * | 4/1994 | Cheng .......................... | 385/76 |
| 5,590,230 A | * | 12/1996 | Cheng .......................... | 385/77 |
| 5,809,192 A | * | 9/1998 | Manning et al. .............. | 385/78 |
| 6,179,482 B1 | * | 1/2001 | Takizawa et al. ............. | 385/81 |
| 2002/0037669 A1 | * | 3/2002 | D'Addario .................. | 439/669 |
| 2002/0177364 A1 | * | 11/2002 | Mine et al. .................. | 439/669 |

* cited by examiner

Primary Examiner—Michael C. Zarroli
(74) Attorney, Agent, or Firm—Kolisch Hartwell, P.C.

(57) ABSTRACT

An adapter for an optical fiber plug has a tubular body. The body has an opening defined through a peripheral wall thereof. A pin is mounted on a front end of the body. The pin has an optical fiber provided therein. A strip is received in the body through the opening. The strip has a hole defined through a central portion and in alignment with the pin, and at least one wing extending from the central portion to a rear end of the body. A housing covers the body. A ring mounted at a rear end of the housing. An optical fiber plug can be inserted in the adapter through the ring for matching a terminal unadapted to the plug.

6 Claims, 6 Drawing Sheets

ADAPTER FOR AN OPTICAL FIBER PLUG

BACKGROUND OF THE INVENTION

1. Field of the Invention

The present invention is related to an optical fiber plug, and more particularly to an adapter for the optical fiber plug which is used for connecting the plug with a terminal having a diameter different from that of the plug.

2. Description of Related Art

In communication equipment, AV equipment etc., optical fibers have been used for transmitting signals because of the superior quality of signal in comparison with conventional wires such as copper. In these devices, there are various specifications of input/output terminals. Two or more devices connected together must have matched plugs and terminals, otherwise proper adapters that can match the plugs and the terminals are needed.

Referring to FIGS. 7 and 8, a conventional adapter for an optical fiber plug is illustrated. The adapter has a body (60) formed as a plug. A chamber (61) is longitudinally defined in the body (60) and a pin (not number) is provided at a front end of the body (60). An optical fiber (90) is received in the pin. A strip (70) and a sleeve (80) are in turn received in the chamber (61). The strip (70) has a hole (71) defined therethrough and aligned with the pin, and is secured by the sleeve (80).

When a plug of a device is inserted in the adapter through the sleeve (80), an optical fiber in the plug is aligned with the optical fiber (90) in the pin through the hole (71). In the case of the adapter connected with a terminal on another device, signals can be transmitted between the two devices by the optical fibers.

However, it is very difficult to install the strip (70) in the body (60). Because the strip (70) is first put in the chamber (61), when an operator inserts the sleeve (80) in the chamber (61), the strip (70) can not be seen. Therefore, the installation of the strip (70) is often not in position, and the hole (71) of the strip (70) is not aligned with the pin. At the same time, the status of the installation can not be checked directly by the operator. Furthermore, even if the improper installation is known, it is also difficult to adjust the strip (70).

Therefore, the invention provides an improved adapter for an optical fiber plug to mitigate and/or obviate the aforementioned problems.

SUMMARY OF THE INVENTION

The main objective of the invention is to provide an adapter for an optical fiber plug that is easy to install and adjust.

Other objects, advantages and novel features of the invention will become more apparent from the following detailed description when taken in conjunction with the accompanying drawings.

DETAILED DESCRIPTION OF THE PREFERRED EMBODIMENT

Figure 1:
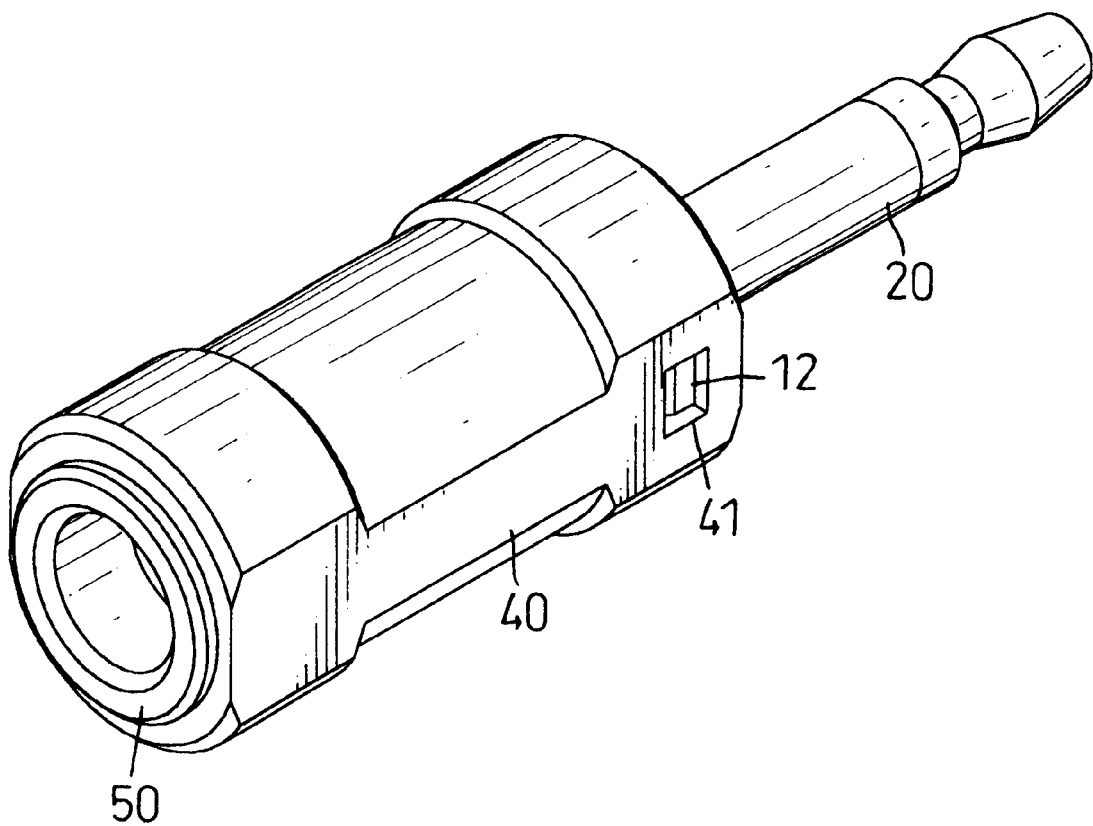
FIG. 1 is a perspective view of an adapter for an optical fiber plug in accordance with the invention.
Figure 2:
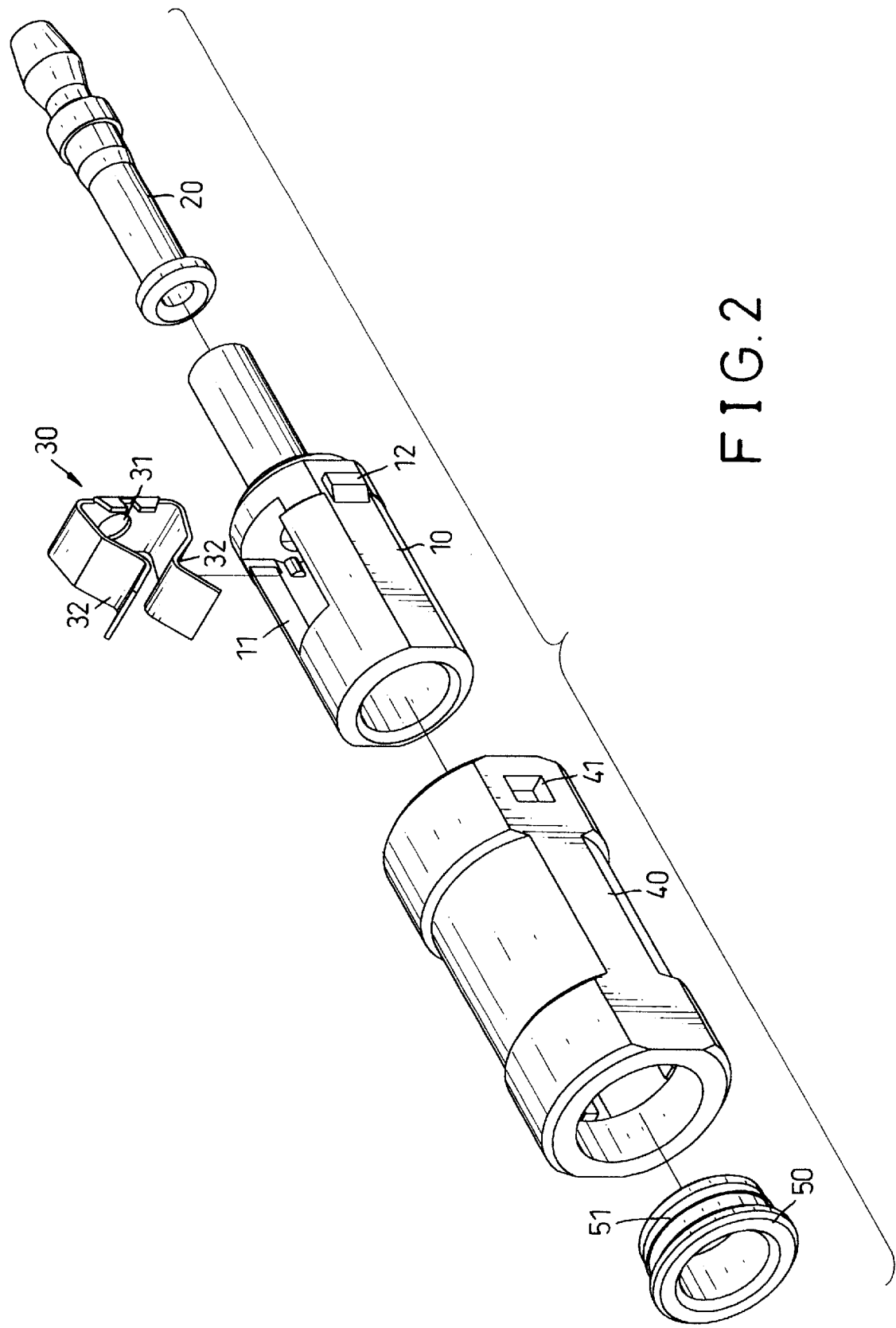
FIG. 2 is an exploded perspective view of the adapter of the invention.
Figure 3:
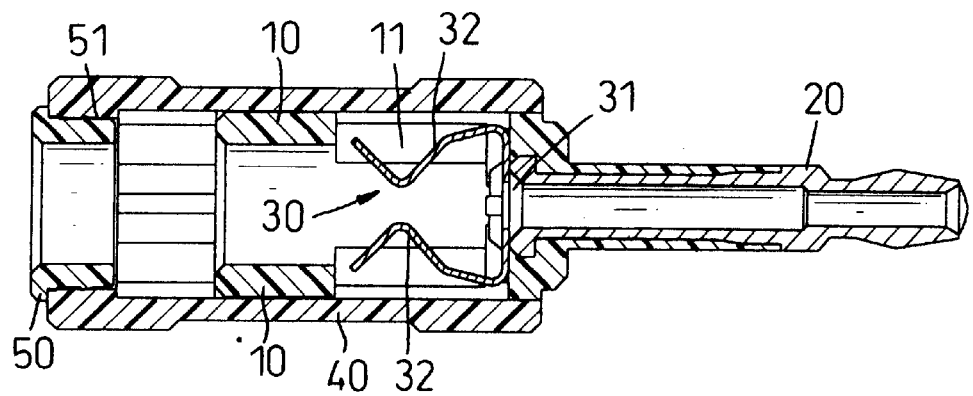
FIG. 3 is a front sectional view of the adapter.
Figure 4:
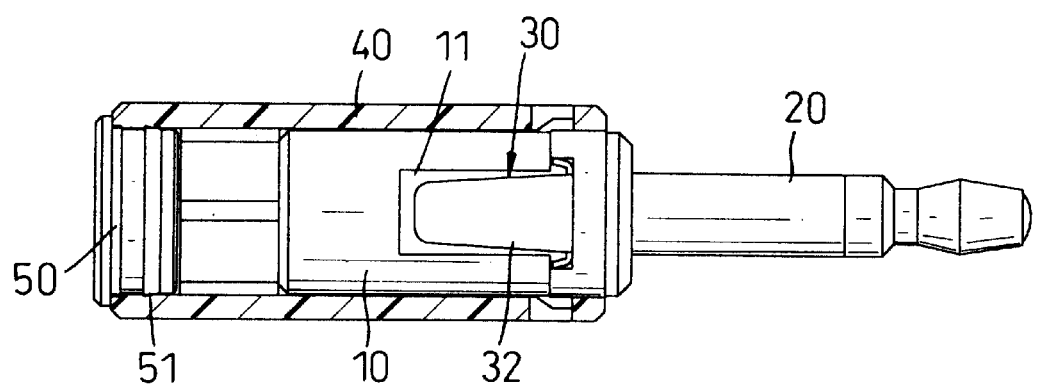
FIG. 4 is a top sectional view of the adapter.

Referring to FIGS. 1–4, an adapter for an optical fiber plug is composed of a body (10), a pin (20), a strip (30), a housing (40) and a ring (50).

The body (10), which is hollow, has an opening (11) defined through a peripheral wall thereof. A protrusion (12) is formed on an outer periphery of the body (10). The pin (20) is mounted at a front end of the body (10) and has an optical fiber (not shown or numbered) provided therein. In this embodiment, an inner diameter of the pin (20) is 2.5 mm.

The strip (30) is received in the body (10) through the opening (11) and has two opposite V-like wings (32) connected by a central portion (not numbered). A hole (31) is defined through the central portion of the strip (30) and aligned with the pin (20).

The housing (40) covering the body (10) has an aperture (41) defined through an outer periphery thereof. The protrusion (12) is engaged in the aperture (41) to secure the body (10) in the housing (40).

The ring (50) is mounted at a rear end of the housing (40) and has a flange (51) formed thereon for securing the ring (50) on the housing (40).

Figure 5:
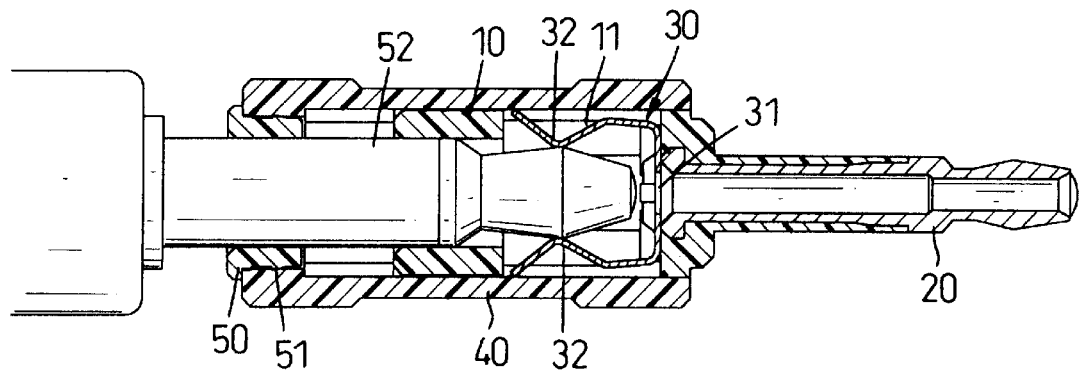
FIG. 5 is a sectional view showing that an optical fiber plug of 3.5 mm is being inserted in the adapter in accordance with the invention.
Figure 6:
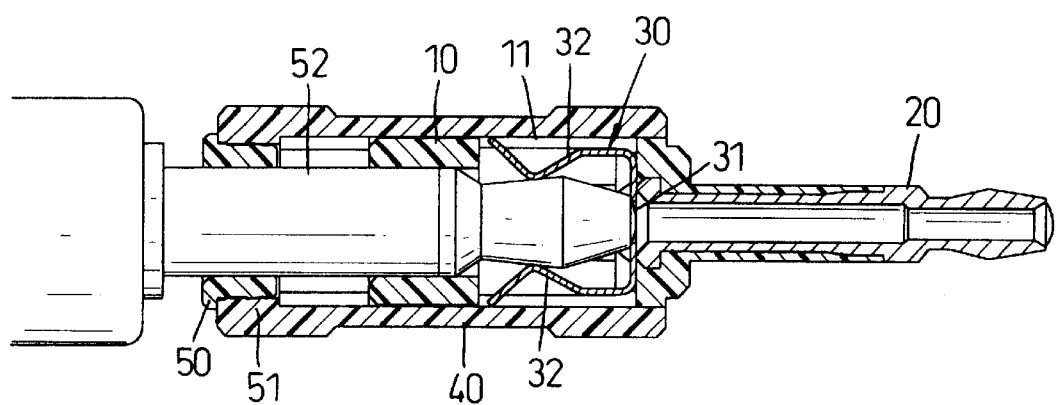
FIG. 6 is a sectional view showing that the optical fiber plug in FIG. 5 has been inserted in the adapter.
Figure 7:
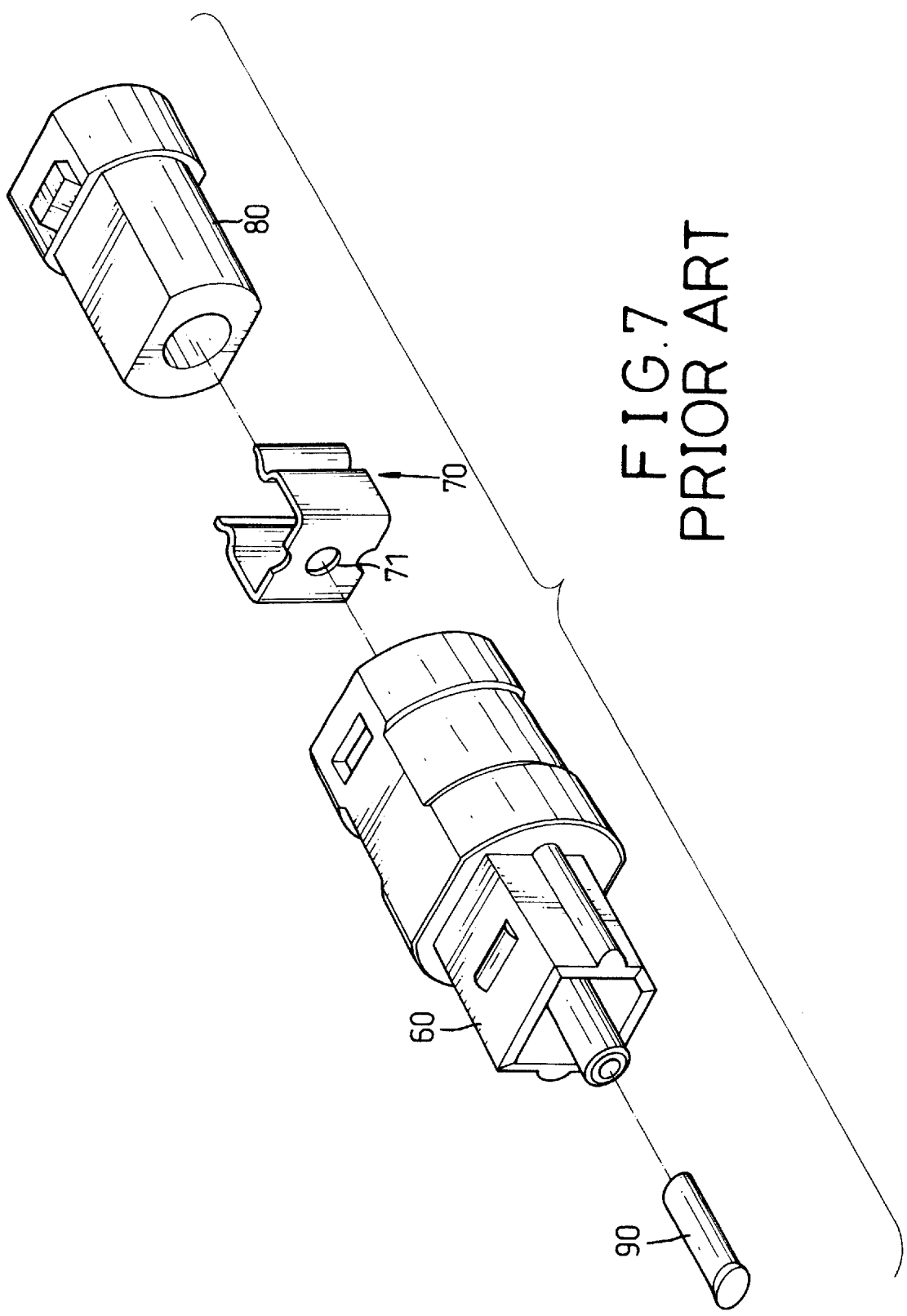
FIG. 7 is an exploded perspective view of a conventional adapter for an optical fiber plug.
Figure 8:
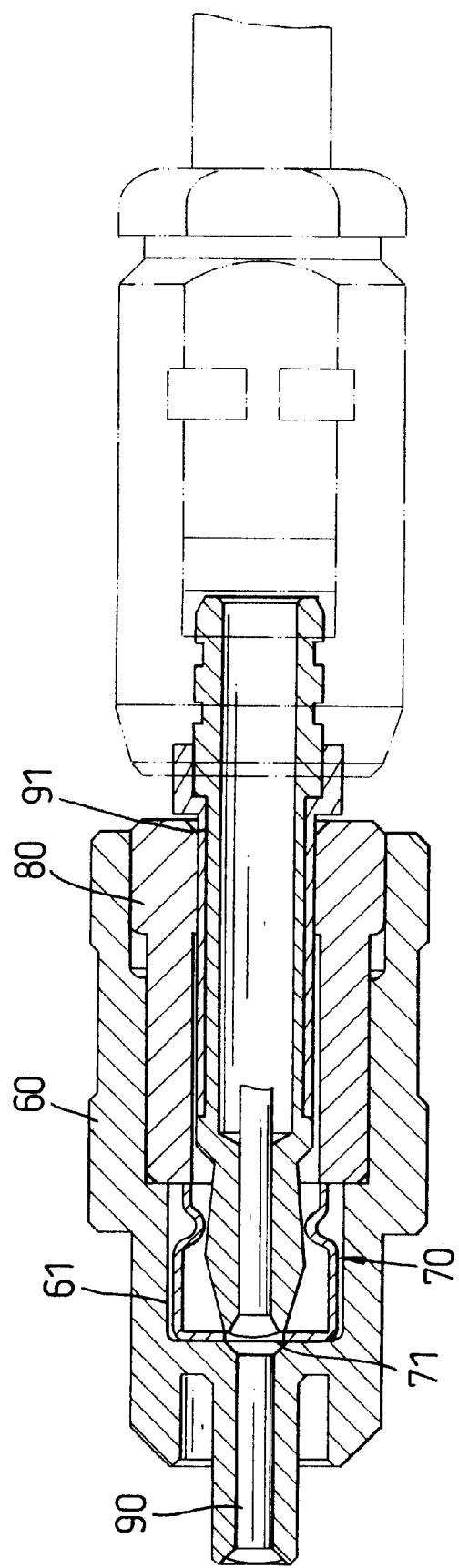
FIG. 8 is a sectional view of the conventional adapter engaged with an optical fiber plug.

When a plug can not be inserted in an unadapted terminal, for example, a 3.5 mm plug can not be inserted in a 2.5 mm terminal, the plug can use the adapter to connect with the terminal. Referring to FIGS. 5 and 6, the plug (52) is inserted in the adapter through the ring (50) and clipped between the wings (32). A front end of the plug (52) abuts the central portion of the strip (30) and is aligned with the hole (31). When the pin (20) is connected in the terminal, signals can be transmitted through the adapter and the plug (52).

According to another embodiment of the invention that is not shown, the strip (32) has only one wing (32) extending from the central portion. The body (10) has a sheet (not shown or number in either figure) formed on an inner wall opposite to the wing (32). The plug (52) can be clipped between the wing (32) and the sheet.

Because the process that the strip (30) is mounted in the body (10) through the opening (11) can be seen by the operator, it is easy to assemble and adjust the strip (30) in the body (10).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An adapter for an optical fiber plug, the adapter comprising:

a tubular body (10), the tubular body (10) having an opening (11) defined through a peripheral wall thereof;

a pin (20) mounted on a front end of the tubular body (10), the pin (20) having an optical fiber provided therein;

a strip (30) received in the tubular body (10) through the opening (11), the strip (30) having a hole (31) defined through a central portion and in alignment with the pin (20), and at least one wing (32) extending from the central portion to a rear end of the tubular body (10);

a housing (40) covering the tubular body (10); and a ring (50) mounted at a rear end of the housing (40).

2. The adapter as claimed in claim 1, wherein the strip (30) has two wings (32) oppositely extending from the central portion of the strip (30).

3. The adapter as claimed in claim 1, wherein the body (10) has a sheet formed on an inner wall opposite to the at least one wing (32).

4. The adapter as claimed in claim 1, wherein the wing (32) is V-like.

5. The adapter as claimed in claim 1, wherein the tubular body (10) has a protrusion (12) formed on an outer periphery thereof, and the housing (40) has an aperture (41) to receive the protrusion (12) for securing the tubular body (10) in the housing (40).

6. The adapter as claimed in claim 1, wherein the ring (50) has a flange (51) formed at an end received in the housing (40).

* * * * *